Patented Oct. 23, 1928.

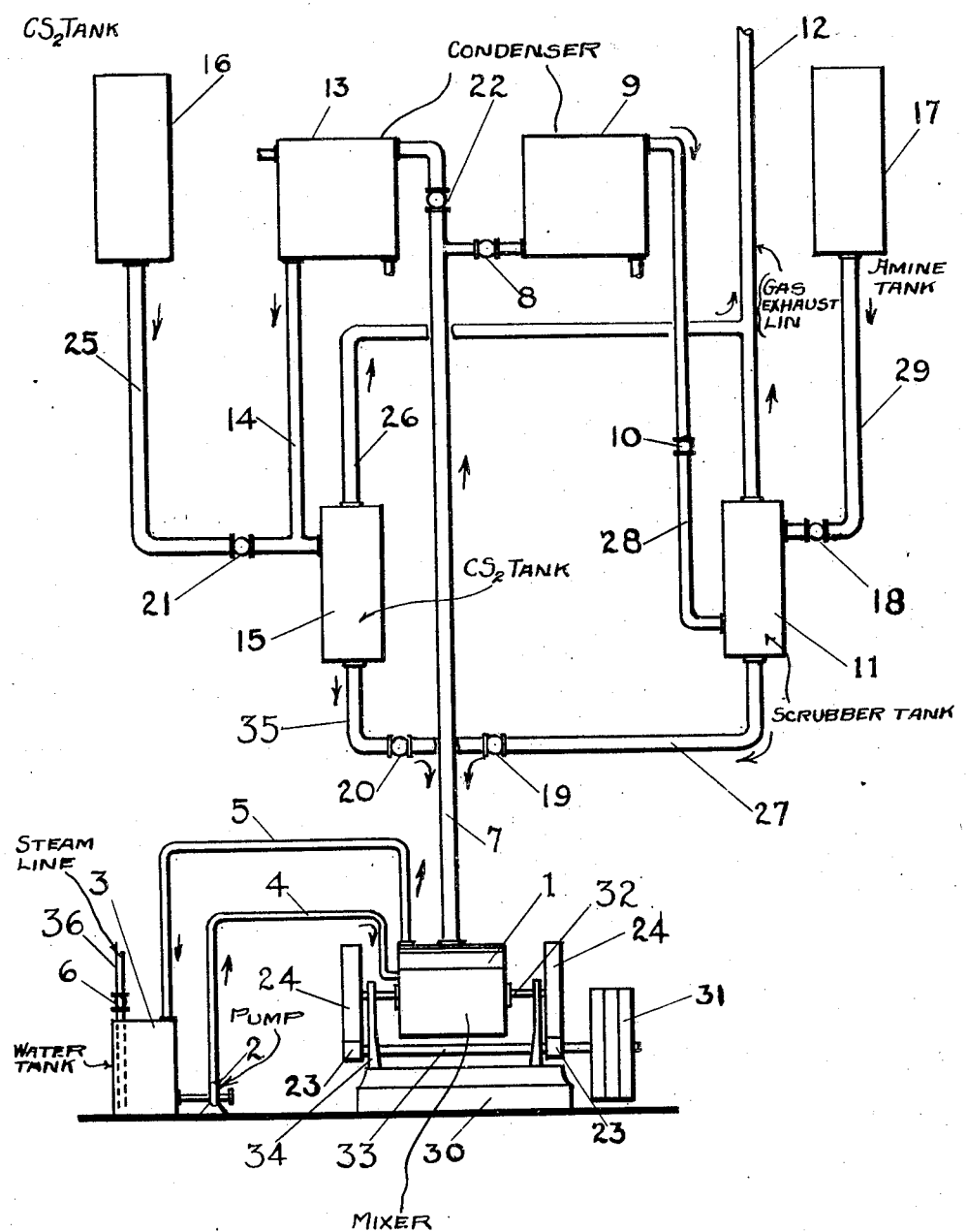

1,688,707

UNITED STATES PATENT OFFICE.

CARL NELSON HAND AND HAROLD P. ROBERTS, OF NITRO, WEST VIRGINIA, ASSIGNORS TO THE RUBBER SERVICE LABORATORIES CO., OF AKRON, OHIO, A CORPORATION OF OHIO.

PROCESS OF CATALYZING THE FORMATION OF THIO-UREAS.

Application filed October 1, 1924. Serial No. 740,941.

The object of our present invention is to provide a method of preparing thio-ureas by an improved process in which a high yield of a pure product is realized. Particularly our invention is directed to the use of suitable catalyzers of the reaction between carbon disulfid and a primary aromatic amine whereby the combination of the materials will proceed more rapidly than is possible if no such catalyzer be used. Although our improved process is applicable to any reaction by which a thio-urea may be produced, it is particularly designed as an improvement in the process of making thio-ureas as is disclosed and claimed in a copending application of C. N. Hand and C. E. Smith, Serial No. 740,940, filed Oct. 1, 1924.

According to this above mentioned application, a thio-urea is obtainable in substantially theoretical quantities and in a high degree of purity by reacting a primary aromatic amine with carbon disulfid under accurately controlled temperature conditions so that the lowest boiling constituent boils gently whereby the hydrogen sulfid formed in the reaction is removed from the reaction zone by the sweeping action caused by the stream of carbon disulfid vapors. The carbon disulfid vapors are condensed and refluxed back to the reaction zone to provide by revaporization therein a continuous supply of a sweeping material and to maintain the quantity of carbon disulfid in the reaction zone comparatively constant. By continually removing the hydrogen sulfid from the reaction zone as rapidly as it is produced in the chamber, the equilibrium of the reaction is disturbed, and the chemical change is therefore forced to go to completion. In this manner a high yield of the product is realized.

According to our improvement of this process, a small amount of a suitable catalyst is used to hasten the chemical change taking place. We have found that substances having a strong alkaline reaction, such as sodium sulfid, calcium polysulfid, and the like, all possess a powerful catalytic effect on the speed of this reaction, but for practical reasons we prefer to use ammonia. The great advantage in the use of ammonia is due to its volatility, whereby it is readily removed from the product after the completion of the reaction, thus making it possible to obtain a thio-urea of such high purity as to require no further treatment. Moreover, the time required for carrying out the process is reduced to approximately 2/3's that needed when the catalyst is not employed. Although any suitable quantity of the catalyst may be used, we have found that the most favorable results are realized when from 0.1% to 0.25% of 26° Bé. aqueous ammonia is used. This may be added directly to the mixer containing the reacting materials, but it is more convenient to add the catalyst in the requisite quantity to the aniline in the storage tank, and then flow this mixture into the mixer in the manner as hereinafter described.

Our process will be readily understood by reference to the following description and accompanying drawing which is a diagrammatic representation partly is section of one arrangement of an apparatus especially designed for carrying out our improved process by the preferred method.

The requisite amount of an armomatic primary amine, such as aniline, containing approximately 0.2% its weight of 26° Bé. aqua ammonia is drawn from storage tank 17 through line 29, controlled by valve 18, into tank 11 and thence through line 27 controlled by valve 19 and through line 7 into mixer 1. The mixer is capable of being tightly closed, and is jacketed so that temperature controlling or heating or cooling means, such as water, may be circulated from tank 3 by means of a circulating pump 2 through line 4 into and through the jacket of the mixer 1, and thence by line 5 back to the tank 3. In case it be desirable to warm the temperature controlling means, steam may be admitted through line 36, controlled by valve 6 to the water contained in tank 3. The contents of the mixer 1 are agitated by means of paddles or other stirring devices (not shown) connected within the mixer to a shaft 32, turned by a gear wheel 24, operated by gears 23, mounted on a shaft 33, which shaft is revolved by a pulley 31, operated by any desired means. The shaft 32 is supported by upright bearings 34, mounted on a suitable foundation or setting 30.

A quantity of aniline or other primary aromatic amine, also containing approximately 0.2% its weight of catalyst, such as 26° Bé. aqua ammonia, and approximately equal to the amount run into the mixer 1, is also withdrawn from storage tank 17, and flowed through line 29 into tank 11, and (valves 19 and 18 being closed), is retained there to serve as a scrubbing means for vapor evolved in the reaction as is more fully described hereinafter.

Carbon disulfid, in quantity equal to approximately 60% by weight of the aniline or other primary amine taken, is withdrawn from storage tank 16 and run through line 25, controlled by valve 21 into tank 15, and thence through line 35 controlled by valve 20, into line 7, and into the mixer 1. The mixer is then closed tightly and the stirring mechanism set in motion. Water, heated to a temperature of 46.2° C. (that is, very slightly above the boiling point of carbon disulfid) and carefully maintained at that temperature, is circulated through the jacket of mixer 1 from tank 3 by means of pump 2 at a rate sufficient to maintain the contents of the tank at the temperature desired. Valves 20, 21, 22, 18 and 19 are closed during this part of the reaction, and valves 8 and 10 are open.

The reaction between aniline or any other primary aromatic amine and carbon disulfid, starts immediately and continues smoothly, especially when carried out in the presence of a catalyst as described, and carbon disulfid, carrying away the hydrogen sulfid formed by the reaction rises thru line 7 into a water cooled condenser 9. The carbon disulfid passing from the reaction chamber is more or less completely condensed, and the condensate returns through line 7 to the mixer 1, while the uncondensed portion, with the gaseous hydrogen sulfid, passes through line 28 into tank 11, which as was mentioned before, contains a second charge of amine, admixed with the catalyst and ready for the mixer. The aniline scrubs out and absorbs the carbon disulfid, while the hydrogen sulfid passes out of and away from the apparatus through vent pipe 12. The reaction taking place in the mixer continues until all the aniline or other amine has been combined with the carbon disulfid, and as the reaction is a comparatively slow one, even in the presence of a catalyst, the time required for the complete change to be effected is a matter of several hours. However, the use of our preferred catalyst ordinarily reduces the time necessary for the reaction to be completed to approximately 2/3's that needed when no catalyst is used.

When the reaction is completed, and no free amine remains in the mixer, a condition which may be recognized in part by a great diminution or nearly complete cessation in the flow of hydrogen sulfid from the vent pipe 12, or by the cooling of the contents of the mixer 1, valve 8 in the pipe leading to condenser 9 is closed, and valve 22 in pipe 7 leading to condenser 13 is opened. The temperature of the water circulating through the jacket of mixer 1 is now increased to approximately 75° centigrade, and all excess and residual uncombined carbon disulfid in the mixer is thereby distilled off. Furthermore, inasmuch as the catalyst used is also volatile at this temperature, it is completely removed at this stage of the process. The vapors of carbon disulfid, together with the vaporized catalyst and a small amount of hydrogen sulfid, pass through pipe 7 into a water-cooled condenser 13, and the condensate flows through pipe 14 into receiving tank 15. All uncondensed vapors, that is, the hydrogen sulfid and catalyst, pass through the tank 15, and thence through pipe 26 and vent pipe 12 into the air. After the carbon disulfid and other volatile substances have been completely removed from the mass in the mixer, colder water is passed through the jacket of the mixer until the product in the mixer is cool. The mixer is then opened, and the product removed therefrom. The thiocarbanilide, or other thio-urea so formed is obtained in a pure state, uncontaminated by excess of reagents, side reaction products or catalyst employed, and requires no subsequent purification.

The reaction taking place between an aromatic primary amine and carbon disulfid to produce a thio-urea is well known. Heretofore the reaction has been carried out either under high temperature conditions, whereby a great excess of carbon disulfid was required, or, if under lower temperature conditions, in a closed chamber from which no provisions were made for allowing the gaseous products to escape during the reaction. This resulted in a gradual slowing down of the speed of the reaction, which soon reached an equilibrium point beyond which the reaction could not go. At this point, there has always been a considerable amount of am'ne left uncombined with the disulfid. The presence of a catalyst does not affect this equilibrium point except that the point may be reached somewhat sooner when a catalyst is present.

In our improved process, the temperature of the reacting materials is carefully controlled to permit, so far as possible, the formation of a minimum quantity of vapors and gaseous products but since they are removed from the reaction zone as soon as they are formed, an equilibrium point for the reaction is never reached and consequently the reaction is forced to proceed to completion. Our invention, then, comprises the use of a catalyst of the reaction in combination with the imposition of such operative conditions that the equilibrium of the reaction is disturbed sufficiently to allow the chemical change to proceed to completion whereby a product is obtained in which all of the amine taken is utilized in the reaction while only a comparatively slight excess of the carbon disulfid is needed. This, as we have pointed out hereinbefore, is accomplished by carrying out the reaction at a temperature approximately equal to and only slightly above the boiling point of the carbon disulfid.

An important feature of the invention is the rapid and complete removal of the hydrogen sulfid from the reaction zone. This is accomplished, as is apparent to those skilled in the art, by the return from the condenser to the reaction zone, of liquid carbon disulfid, which quickly becomes heated and vaporized, and picks up the hydrogen sulfid as fast as it is formed in the reaction and conducts it away from the chamber. This prevents the mass from reaching an equilibrium and thereby enables the reaction to go to completion. The repeated vaporization, condensation, and refluxing of carbon disulfid serves, then, as an efficient means of disturbing the equilibrium of the reacting mass by causing the constant removal of one of the products of the reaction.

Although any desired quantities of materials may be used, we have found that for every 100 pounds of thio-urea desired, approximately 83.5 pounds of a primary aromatic amine containing from 0.1 to 0.25% its weight of ammonia and approximately 50 pounds of carbon disulfid should be used. In all cases, it is desirable to use a moderate excess of carbon disulfid (as compared with other known commercial methods of preparing these materials) in order to react completely with all the amine taken and to furnish sufficient vapors to serve as a means of removing hydrogen sulfid from the reacting mass.

Although we have limited the description of our process chiefly to the manufacture of thio-carbanilide, we have found that other amines than aniline may be efficiently used in our process. Thus, the toluidines, the xylidines and in fact, other primary aromatic amines have been found to react at an accelerated rate with carbon disulfid in the presence of our preferred type of catalyst. It is to be understood that our invention is not limited nor dependent upon the accuracy of any theories advanced by way of explanation but is limited solely by the claims attached hereto and made a part of this specification and wherein we intend to claim all novelty inherent in our invention that is permissible in view of the prior art.

What we claim is:

1. The process of making a thio-urea which comprises interacting a primary aromatic amine and carbon disulfid at temperatures from 46 to 46.2° C. in the presence of an alkali completely volatilizable at a temperature not substantially above the boiling point of carbon disulfid.

2. The process of making a thio-urea which comprises interacting a primary aromatic amine and carbon disulfid at temperatures from 46 to 46.2° C. in the presence of a small quantity of ammonia.

3. The process of making thio-carbanilide which comprises interacting aniline and carbon disulfid at temperatures from 46 to 46.2° C. in the presence of an alkaline catalyzing agent completely volatilizable at a temperature below 75° C.

4. The process of making thio-carbanilide which comprises interacting aniline and carbon disulfid at temperatures from 46 to 46.2° C. in the presence of a small quantity of ammonia.

5. The process of making a thio-urea which comprises reacting carbon disulfid and a primary aromatic amine containing from 0.1 to 0.25% of an alkaline catalyzing agent, said catalyzing agent being completely volatilizable at a temperature below 75° C. maintaining said reacting mixture approximately at the boiling point of the carbon disulfid, removing the vapors and gaseous by-products, distilling the said vapors, returning the condensed vapors to the reacting mixture for revaporization to remove a further quantity of gaseous by-products, and finally removing the uncombined carbon disulfid and residual volatile alkaline catalyzing agent from the thio-urea by distillation at a temperature of approximately 75° C.

6. The process of making thio-carbanilide which comprises reacting carbon disulfid and aniline, containing approximately 0.2% its weight of ammonia, maintaining said reacting mixture approximately at the boiling point of the carbon disulfid, removing the vapors of carbon disulfid and the hydrogen sulfid, distilling the said carbon disulfid, returning the condensed carbon disulfid to the reacting mixture for revaporization to remove a further quantity of hydrogen sulfid and finally removing the uncombined carbon disulfid and residual ammonia from the thiocarbanilide.

In testimony whereof we affix our signatures.

CARL N. HAND.
HAROLD P. ROBERTS.